United States Patent [19]
Stralser

[11] 3,975,247
[45] Aug. 17, 1976

[54] TREATING SEWAGE AND RECOVERING USABLE WATER AND SOLIDS

[76] Inventor: Bernard J. Stralser, E. 12726 Apache Pass, Spokane, Wash. 99206

[22] Filed: Jan. 23, 1974

[21] Appl. No.: 435,655

[52] U.S. Cl. .............................. 204/152; 204/149; 210/62
[51] Int. Cl.² ...................... C25B 1/26; C02B 1/82
[58] Field of Search .......... 204/149, 152, 275, 276, 204/268; 210/13, 44, 62

[56] References Cited
UNITED STATES PATENTS

| 820,482 | 5/1906 | Dion | 204/276 X |
| 968,492 | 8/1910 | McDorman | 204/268 |
| 1,194,000 | 8/1916 | Dobyns et al. | 204/149 |
| 3,563,879 | 2/1971 | Richards et al. | 204/272 |
| 3,684,703 | 8/1972 | Marmo | 210/13 |

FOREIGN PATENTS OR APPLICATIONS

| 1,119,339 | 7/1968 | United Kingdom | 204/149 |

*Primary Examiner*—Donald L. Walton
*Assistant Examiner*—A. C. Prescott
*Attorney, Agent, or Firm*—Wells, St. John & Roberts

[57] ABSTRACT

The waste sewage that accumulates from humans, animals and vegetables is first diluted with water to provide a product comprising twenty parts water to one part solids by weight. This diluted product is subjected to a macerating and comminuting and mixing operation that breaks down the lumps in the solids to a size where they are either dissolved or carried in suspension. From the macerator, the fluid is moved up through a screen chamber having a screen of 1/8 inch to remove any heavy, large particles therein and is next pumped into non-conductive electrolytic cell containers. An overflow connection returns any gas and excess liquid into the screening chamber. In the electrolytic cell, the fluid is passed up and down between a plurality of electrode plates of platinum-coated titanium, that are essentially unattacked by the fluid contents and do not contribute any of their metal to the reaction, which are so connected that current flows across the flow of fluid repeatedly with only one end electrode of the plurality connected to the positive side of a direct current source and the other end electrode connected to the negative side of the current source. Enough voltage is supplied to maintain a current flow of 0.25 to 1.0 amperes per square inch of electrode surface. Thus the fluid is passed repeatedly across the current path and is subjected to a continuously step-by-step changing of the level of potential with respect to the original ground voltage of the fluid entering the cell. In each passage across the current, the fluid is changed by the reactions and most of the gases evolved are removed from the field of reaction upward so as to present a newly constituted fluid to the next passage. The effluent from the cell is cleared of the solids by a skimming and filtering action to recover the water for re-use and the solids for return to earth.

6 Claims, 7 Drawing Figures

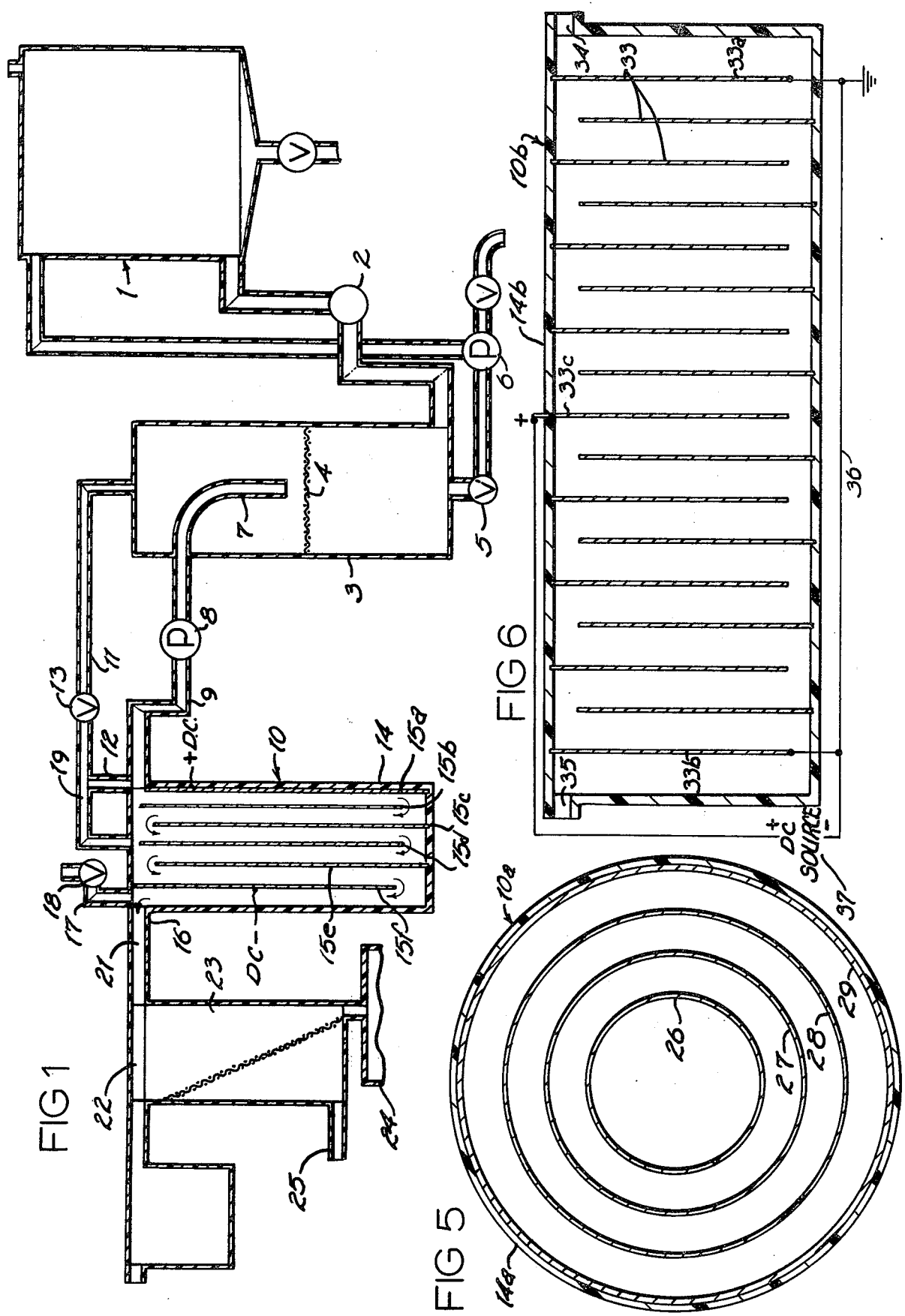

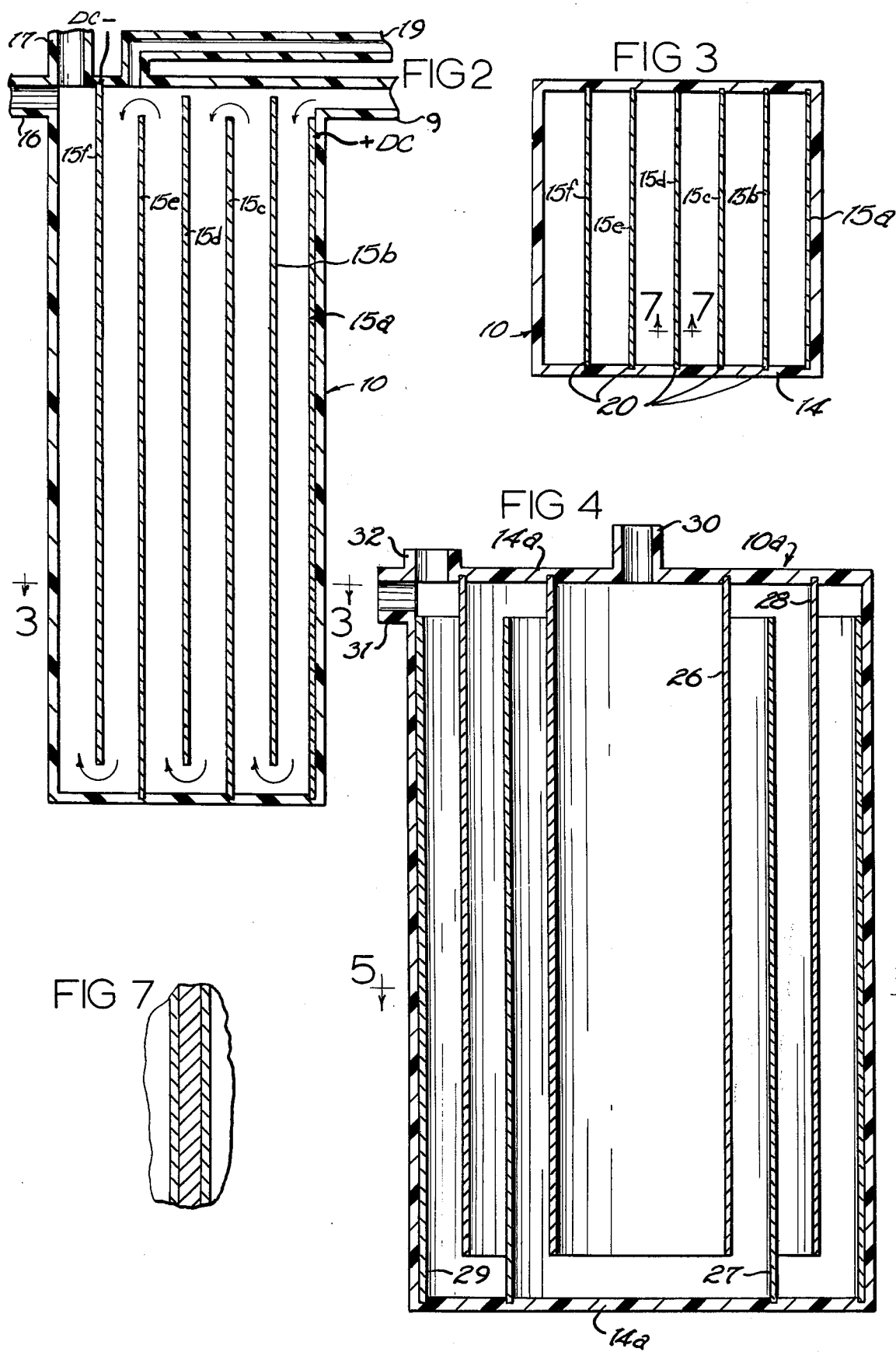

3,975,247

TREATING SEWAGE AND RECOVERING USABLE WATER AND SOLIDS

BACKGROUND OF THE INVENTION

The use of electrical energy to overcome the bad features of sewage and to make the water therein re-usable is known but thus far to my knowledge has not been practical enough on a small scale to justify its adoption generally. The U.S. patent to Landreth No. 1,139,778 contains a general disclosure of the problems. Other Landreth patents are 1,095,893 and 1,131,067, prior to the first-named patent and Landreth patents No. 1,507,121, No. 1,146,942 and 1,222,637.

Other prior patents which are pertinent to this field are U.S. patents as follows:

| Moerk | 1,505,104 | Mehl | 3,335,078 |
|---|---|---|---|
| Parker | 1,069,169 | Neidl | 3,336,220 |
| Hartman | 943,188 | Kikindai | 3,479,281 |
| Mehl | 3,340,175 | Armstrong | 3,664,951 |
| Slagle | 2,158,595 | Mehl | 3,523,891 |
| Webster | 398,101 | Stralser | 3,691,041 |
| Harris | 857,277 | | |
| Chappell | 3,010,886 | | |

PURPOSE OF THE INVENTION

The primary purpose of the invention is to provide a method and apparatus that can be used on such mobile vehicles as ships, boats, mobile homes, buses, and aircraft and that is applicable also to small stationary places where human and animal and vegetable wastes or sewages are accumulated using water as the carrier, whereby the waste and carrier water are reduced to water and solids that are sufficiently purified to be safely re-useable.

More specifically, it is the purpose of this invention to provide a method of apparatus operable to combine the waste products with enough water to make a readily flowable liquid having therein the wastes and solution and suspension and sufficient sodium chloride to make the liquid and its contained solids a good conductor for electrical current; then successively flowing the liquid in layers transversely to an electrical current flow wherein the current density is at least .25 amperes per square inch liquid area exposed to the current flow, and the potential across the several layers equals the sum of the potentials across the individual layers.

BRIEF DESCRIPTION OF THE DRAWINGS

FIG. 1 is a flow diagram illustrating the several steps of treatment of sewage and other contaminated water; and FIG. 2 is a sectional view through one form of the electrolytic treatment cell;

FIG. 3 is a sectional view on line 3—3 of FIG. 2;

FIG. 4 is a sectional view of another form of the electrolytic cell;

FIG. 5 is a sectional view on the line 5—5 of FIG. 4;

FIG. 6 is a sectional view similar to FIG. 2 showing still another form of cell and;

FIG. 7 is an enlarged fragmentary sectional view through a portion of an electrode plate on the line 7—7 of FIG. 3.

GENERAL DESCRIPTION

The problems of disposing of human, industrial, and animal wastes have plagued us for generations. The solutions of these problems have been the subject of many developments. At present, it appears that the greatest need is for units of disposal which are economically capable of breaking down these wastes into bacteria-free water and solids where the size of units will take care of the pollution that normally would be caused by up to 100 humans or animals or a small industrial plant. The present invention can do this, returning to use the water and solids essentially free of the substances formerly in the wastes which were so detrimental to the environment.

According to the invention, the waste to be treated should have a sufficient water content as to be readily flowable with the contained solids in suspension. The waste is first macerated to wet and divide the solids in the liquid and reduce particle size of any solids of the waste so that the particles will be such that the resulting fluid mixture will respond substantially uniformly to electrolytic action.

The liquid must have sufficient electrical conductivity. On boats using salt water from the ocean to carry the waste, the salt water provides adequate conductivity. In dairy waste from the barns, etc., enough water is added to provide at least 20 parts added water to 1 part dairy waste by weight, and enough common salt (NaCl) is used to make a 0.05% to 3.5% salt (by weight) solution. This is adequate to make the wastes sufficiently conductive and to provide sufficient chloride compounds in the solution for effective bacteria kill. The percentage of salt in the waste solution may be up to saturation. However, if more salt (NaCl) is used than is necessary, the resultant recovered water will be too salty to be used without de-salting. It is preferred to use the lowest effective salt content.

Referring now to the drawing, the liquid having the diluted fluids and solids in solution and suspension are drawn from the source 1 of the diluted wastes through a macerator 2 of any known type to reduce particle size of waste solids. The effluent from the macerated waste is fed upward into a closed vessel 3 and through a screen 4 (of about ⅛ inch mesh) in the vessel 3 to stop any solids of excess size remaining after maceration. This also removes any heavier hard particles.

The vessel 3 has an outlet with a valve 5 and a pump 6 in it to draw off and return the solids that do not go through the screen 4 back to the supply source 1. A tube 7 having its open end near the screen 4 extends upwardly and outwardly out the vessel 3 to a pump 8. The wastes under treatment, upon leaving the pump 8 have been so well mixed with water by the macerator 2, the screen 4 and the pump 8 to provide a substantially uniform fluid wherein the solids not dissolved in the water remain in suspension in a substantially colloidal state. The fluid is directed through a conduit 9 either to be an electrolytic cell 10 or to a bypass conduit 11 that will return the untreated fluid to the vessel 3. Provision is made by connecting conduits 12 and 19 and a valve 13 to draw off any gas that rises from the untreated liquid leaving the pump 8 and cell 10 and to return this gas with any excess fluid to the bypass conduit 11.

The cell 10 comprises a container 14 of polyvinyl chloride which is an electrical insulator and which is inert to the material under treatment. Within the container are a plurality of electrodes 15 spaced apart and arranged as shown so that the fluid waste material from the pump 8 is directed down between electrodes 15a and 15b, then beneath the electrode 15b and upwardly between electrode 15b and the adjacent electrode 15c then over the electrode 15c then downwardly between electrode 15c and electrode 15d and beneath the electrode 15d and upwardly between the electrodes 15d and 15e, then over electrode 15e and downwardly between electrodes 15e and electrode 15f and upwardly outside of electrode 15f to an outlet conduit 16. In the cell 10, the electrode f is a cathode connected to the negative side of a source of direct current and the electrode 15a is connected to the positive side of the direct current source.

The cell 10, shown in section in FIG. 2, makes it possible to use a relatively high voltage across the cell when compared to the usual parallel connection where alternate electrodes are directly connected to the current source as cathodes and the remaining electrodes are directly connected to the current source as anodes. This type of connection cooperates with the waste product to provide a self-regulation that is quite important in the purification of the waste. In order that this feature of the invention will be more fully understood, the reactions in the cell where the waste is given the desired conductivity by use of chlorides of such metals as sodium, potassium, calcium and magnesium. The waste treatment to be effective utilizes the breakdown of these salts to produce oxygen ($O_2$), ozone ($O_3$), hypochlorites (HClO) and chlorine. The reactions are generally as follows.

When sodium chloride is dissolved in water, the dissociation of the salt liberates sodium ions Na+ i.e. sodium ions with a positive charge and chlorine ions Cl⁻ i.e. chlorine ions which have a negative charge. The sodium ions are attracted to the cathode inserted in the water solution. The chlorine ions are attracted to the anode in the water solution. The sodium ion reacts with water to form NaOH liberating a hydrogen ion. Two of the hydrogen ions combine to form $H_2$, a gas which escapes to atmosphere. The NaOH in the solution combines readily with the chlorine ion to produce sodium hypochlorite or chlorate or perchlorate in situ.

When chlorine and hydroxyl ions react, they react with each other as:

$Cl_2 + OH^- = Cl^- + HClO$ (hypochlorous acid)

with the reaction predominately to the right. However, the hypochlorous acid is removed by combination with the NaOH, or more specifically with the hydroxyl ions:

$HClO + OH^- = ClO^-$ (hypochlorite ion) $+ H_2O$

The whole process can be represented by:

$Cl_2 + 2 OH^- = Cl^- + ClO^- + H_2O$ or:

$Cl_2 + 2NaOH = NaCl + NaClO + H_2O$

Note that only one half the chlorine discharged at the anode is combined as hypochlorite. The rest is available for disinfection and residual chlorine. Not all the hydroxyl ions combine as indicated, but some migrate and diffuse to the anode to be discharged as:

$2 OH^- - 2e = H_2O + O^-$

Note the singlet oxygen, which is available to react with bacteria, organics, and for bleaching. In addition at the anode, the $ClO^- - e = ClO$ and will combine with water as:

$6 ClO + 3H_2O = 4 HCl + NaClO_3$ (sodium chlorate)

The HCl produces more hypochlorous acid: HCl + NaClO = NaCl + HClO; as can be seen more NaCl is produced to proceed with the previous reactions continuously.

At the cathode, the reaction can be:

$NaClO - OH = H_2O + NaCl$; again producing more NACl for reactions as previously described.

In addition, the hypochlorite can be decomposed by means of the following reactions:

$3 NaClO = Na ClO_3 + 2 NaCl$ and $2 Na ClO = O_2 + 2 NaCl$ thus furnishing more oxygen oxdative species, and NaCl for continuation of the process.

The latter two reactions usually occur slowly, however they can proceed very rapidly if catalyzers such as certain oxides are present. This is the basis for using inert electrodes having surfaces of the metals of the platinum group such as Ir, Os, Pt, Pd, Rh or Ru, or oxides, or others as meet the requirements. The electrolytic cell should be operated at a high current density, because this produces a high concentration of hypochlorite. This is possible in this instance with the high NaCl concentration in the brine solution. Since these reactions as specified above occur in addition, then we find oxygen, singlet oxygen and ozone as well as chlorine produced in-situ. The moisture is necessary for the bleaching and germicidal action of the chlorine which combines with water to produce hypochlorous and hydrochloric acid as:

$Cl_2 + H_2O = HCl + HClO$ $HClO = HCl + O$

Ozone, $O_3$ is formed according to the reaction, $3O_2 \rightarrow 2 O_3 - 680$ O calories, and comes into low concentration equilibrium with oxygen. When at equilibrium, $O_3$ decomposes as rapidly as it is formed. With the high concentration of NaCl and the ultimate high yield of $O_2$, in-situ, then the equilibrium concentration of ozone can be greatly in excess of 10 ppm, with a lifetime of about 20 minutes before reverting to $O_2 + O$, thus resulting in a high dissolved oxygen (D.O.) content in the water. A concentration of 0.01 ppm, $O_3$ up to 0.10 ppm may be used for destroying offensive odors. For preventing bacterial and fungal growth, a concentration of 0.5 ppm, $O_3$ is needed. Test data have shown that current densities of 0.25 — 1.00 amp/in² will result in 100% Coliform (specifically E Coli) kill during electrolysis. Since $3/2 O_2$ is already formed during electrolysis an additional free energy of 39.0 K cal mole⁻¹ is needed for the theoretical yield of 1058 gm $O_3$ per KW. hour. However, the overall theoretical yield drops to 198 gm per KW. hr in a reversible process. Twenty four gm per KW hr is the highest yield so far obtained but in practice the yield is much smaller. However, electrolytic production of $O_3$ can produce up to 58% $O_3$ by weight.

Thus one can see from the above, the production of sufficient quantities of ozone ($O_3$), oxygen ($O_2$), atomic (singlet) oxygen (O), hypochlorite (HelO) and Chlorine ($Cl_2$) for rapid, 100% bacterial kill, deodorization, and bleach, generated in-situ will accomplish the desired result.

Referring now to the cell 10 shown in FIGS. 2 and 3, it will be noted that the path of the fluid waste is elongated to encompass the length of the spaces between electrodes so that the waste is subjected to electrolytic action over a distance equal to about five times the lengths of a space between two electrodes when six electrodes are used. The same amount of current flows across each of the spaces since in this form of cell, only the outside electrodes 15a and 15f are connected to the current source which provides a high enough voltage across each space (about 4.1 to 5 volts) to get a current density of 0.25 to 1.00 amperes per square inch of cathode surface.

The intermediate electrodes 15b, 15c, 15d and 15e, are at potentials between the positive potential or anode 15a and the negative potential of cathode 15f. Since the reactions described hereinbefore start in the area between electrodes 15a and 15b and continues to cathode 15f, I find that a self-compensating effect on the current flow results. If more or faster flow of the waste fluid occurs, the amount of current flow with a fixed voltage across electrodes 15a–15f will increase, thus giving a higher current density per unit of active electrode surface. The higher current density speeds up the reactions. This result apparently is due to electrolysis making the fluid less conductive as the purification proceeds and, this means higher resistivity per layer of fluid from the layer between 15a and 15b to the layer contacting electrode 15f. The electrodes 15b, 15c, 15d and 15e do have varying potential, since they have no direct connection to a source of current.

The gases in the cell 10 and rising to the top of the cell are taken off through an outlet conduit 17, beyond electrode 15f, which has a valve 18 therein. The gases such as hydrogen, carbon dioxide, and nitrogen can be released to atmosphere. The gases rising before reaching cathode 15f are taken off through conduit 19 to conduit 11.

The fluid is discharged from the cell 10 as a liquid-solid in mixture in which the solids contain about 85% of the phosphates that were in the untreated waste. The solids are filtered, skimmed off and settled out of the liquid so that the liquid is capable of being re-used. To remove the phosphates, it is necessary promptly to remove the foam that is present on the effluent that is discharged from the cell 10, otherwise the phosphates will re-dissolve into the liquid effluent. The bacterial kill is essentially 100%. If the salt (NaCl) content of the macerated waste liquid can be kept below 3.5% the effluent can be kept within a range of 250 to 400 parts salt per million parts water which can be tolerated as potable water. If more salt is present in the effluent, it must be desalted to make it potable.

A considerable variety of animal wastes can be treated by this process so that the water and the solids can safely be returned to use, the contamination being completely removed from the water and the solids. Such wastes as human waste (on boats and in camps or buildings where the large sewage waste conversions used in large cities and are quite impractical), dairy animal wastes, hog, cattle, and chicken, or fowl wastes.

The solids recovered from the wastes can be returned to the soil since they do contain essential minerals for the growth of plants and they do not contain live bacteria that were in the waste. The water content of the effluent is in such condition that it is re-usable in treating more waste and any excess water is available for other purposes, without fear of carrying over the harmful bacteria from the wastes that were treated.

Structurally, the cell 10 is made as shown in FIGS. 2 and 3. The container 14 has grooves such as 20 formed in its opposing walls to receive the side edges of the electrodes. This makes it possible to remove or change the electrodes 15 quite easily. The grooves for the electrodes 15b, 15d and 15f go down only part way to the bottom of the container 14 so that they hold these electrodes above the bottom of the cell.

The spacing between electrodes may vary considerably. In waste liquids having high salt content, i.e. above 3.5% NaCl, a spacing of ½ to ¾—inch may be used. Generally, it is advisable to use smaller spacing down to a spacing of near 3/16 inch spacing to insure even current density through the fluid between the plates. This fluid is essentially water with the undissolved solids floating therein and with gas evolving as the reaction takes place. The amount of gas evolved does greatly reduce the rate of flow more when the electrode spacing is reduced. For example, in a cell having a set of 8 pairs of cathode-anode plates 4½ inches wide, 10¾ inches high and spaced apart ⅛ inch, a flow of 15 gallons of waste fluid (macerated) per minute was obtained when the electrodes were not connected to a current source. Upon connecting the plates across a source of current sufficient to provide current density of 0.25 amp. per square inch of electrode surface, the amount of fluid flow went down to 5 gallons per minute. This, I believe, is in part due to the tendency of evolved gases to oppose the down flow of liquid and the entrained solids.

The effluent leaves the container 14 at 21 and is immediately subjected to a skimmer 22 to remove the foam containing the light phosphates that rise to the top of the effluent liquid. These phosphate solids have to be skimmed off from the effluent or they will quickly re-dissolve in the effluent water. The liquid flows beneath the skimmer 22 into a filter and settling chamber 23 where the solids that settle down are collected for removal and delivered into another container 24. The now bacteria free liquid is removed at 25 from the container 24. The details of the skimmer and filter are not part of this invention.

FIGS. 4 and 5 illustrate a form of cell 10a which offers certain advantages in that it provides for larger cathode surfaces than anode surfaces. I have found this to be helpful in getting enough emission of current from the cathode. Ideally the cathode surface should be nearly double that of the anode surface. To get larger cathode surface, I make the platinum coated titanium electrode plates 26, 27, 28 and 29 as concentric cylinders with the innermost cylinder 26 positive and the outermost cylinder negative. The fluid to be treated is introduced inside the cylinder 26 through an inlet 30. It flows down beneath cylindner 26 and upwardly between cylinders 26 and 27 so that 26 is the anode and 27 is the cathode with respect to the fluid flowing up between 26 and 27. Electrode 27 has a surface much larger than the outer surface of electrode 26. With respect to the downflowing fluid between electrodes 27 and 28, the electrode 27 is the anode and the larger surfaced electrode 28 is the cathode. For the upflowing stream of fluid between electrodes 28 and 29, the cathode 29 again has much larger surface then the outer surface of electrode 28.

The treated liquid with its entrained solids flows out through an outlet 31 and the gases are taken off through an outlet 32 of the container 14a.

In FIG. 6, I have illustrated another electrode assembly where the fluid to be treated enters the container 14b is an elongated body of the same material as the container 14. The several electrodes 33 are arranged essentially the same as the electrodes 15 in FIG. 2. A fluid inlet is provided at 34 and a fluid outlet is provided at 35. The end electrodes 33a and 33b of the series are connected to a common ground wire 36. As shown there are 17 electrodes 33 and the mid electrode 33c is connected to a source of direct current 37 having sufficient potential to make the electrode 33c either positive or negative with respect to ground that the desired 0.25 amperes per square inch is caused to pass from electrode to electrode.

With this arrangement, the fluid to be treated is brought into the container 14b where it is at ground potential and gradually increased in potential to the mid point electrode 33c which is at a potential about 40 to 50 volts more positive or more negative than ground potential. As the fluid flows from contact with the electrode 33c to the outlet 35, the fluid potential returns to ground potential so as to avoid possible communication of electrical charges to apparatus handling the fluid entering or leaving the container 14b.

The cells 10a, and 10b use the same auxiliary equipment, such as macerators, pumps, valves, screens, and skimmers as the cell 10. The gases coming from the cells may be all collected at the top of the container (14, 14a or 14b) and caused to pass through the final passage between electrodes 15c and 15f by valve 13 closing off flow through conduit 11, the gases can then be discharged through the conduit 17 to any suitable reclaimer where such remaining gas as nitrogen or chlorine can be separated for other use to prevent putting excess toxic gas into the atmosphere. The evolved hydrogen gas may be collected and used as fuel to produce energy.

The following examples of treatment using the method herein described show the results as measured by Universal Laboratories.

Sewage from Tacoma Sewage Plant No. 3, Tacoma, Washington used as raw material. It contained about 20 parts water to one part solids.

Three barrels of raw sewage were taken. One barrel No. 1 was held as a comparison barrel with no treatment. Another barrel No. 2 of sewage was passed through the apparatus shown in FIG. 1 of the drawings and macerated as described and screened, then passed to and through a cell constructed as shown in FIG. 1 but with the electrodes 15 connected in parallel across a direct current source at 6 volts. That is electrode 15a was an anode, 15b was a cathode, 15c was an anode, 15d was a cathode, 15e was an anode and 15f was a cathode. The fluid sewage was passed between the several anode-cathode pairs in series from the cell inlet to its outlet at a rate of approximately 5 gallons per minute. The anode-cathode spacing was about three sixteenths inch. The area of one face of each electrode plate was about 96 square inches and the dimensions of the surface were about 6 inches across and 16 inches long. No filtering or skimming of the effluent from the cell was done. The current flow was about 75–80 amperes during the flow through of the liquid.

The third barrel No. 3 of sewage was treated like the No. 2 barrel of sewage but the effluent from the electrolytic cell was skimmed and filtered as described hereinbefore and the liquid effluent recovered.

The No. 1 untreated sewage was then compared with the treated effluents from No. 2 and No. 3 by the aforesaid Universal Laboratories who reported as follows:

| Sample | No. 1 Untreated | No. 2 Treated but not filtered | No. 3 Treated and Filtered |
|---|---|---|---|
| Standard plate count per gram | 4,000,000 | 30 | Less/1 |
| Coliform Count M.P.N. per 100 ML of sample | 2,400,000 | 2 | Less/2 |
| Fecal Coliform M.P.N. per 100 ML of sample | 110,000 | Less/2 | Less/2 |
| Fecal Streptococci M.P.N. per 100 ML of sample | 1,100,000 | Less/2 | Less/2 |

(M.P.N. as here used means most probable number)

In these test treatments, the cell electrodes were platinum-coated titanium plates. After treating each of the sewage fluids, the plates were found to be bright and showed no signs of wear or pitting.

A second test treatment was carried out on raw dairy waste from the State Experimental Farm of Washington State University, Puyallup, Washington. The diluted dairy waste before treatment gave a standard plate count per gram of 2,100,000 per ML. The M.P.N. for coliform count in the sample before treatment was above 110,000 per 100 ML. For E Coli the M.P.N. was above 46,000 per 100 ML, and the Fecal Streptococci M.P.N. was above 24,000 per 100 ML.

The raw dairy sewage was diluted with water to about 20 parts liquid per 1 part solids to the diluted raw sewage. Sodium chloride was added in amount of 1000 ppm in the diluted product bringing the saline content to about 0.16%.

This solution was treated in the apparatus of FIG. 1 in the manner heretofore described including the skimming and filtering steps using parallel connected anodes and cathodes and applying 6 volts direct current anode to cathode. The current was approximately 75 amperes and the rate of flow of the diluted sewage through the cell was about 5 gal. per minute. The effluent was substantially decolored and both liquid and solids after treatment had no noticeable odor.

In the feeding of hogs, the waste material secreted by the hogs is often run into a lagoon of water which soon becomes so contaminated as to be objectionably odorous and is covered with algae. A sample of the liquid in such a lagoon which was red in color was analyzed and gave the following results before treatment.

Total solids — 1580 ppm.
Chloride content — 101.9 ppm
Standard plate
Count in Sample — 7,500,000 per 100 ML
M.P.N. Coliform — above 110,000 per 100 ML
M.P.N. E. Coli — above 110,000 per 100 ML
M.P.N. Fecal. Strep. — above 1,500 per 100 ML This lagoon liquid sample was treated in accordance with my process using the equipment of FIG. 1 with four electrodes in series across a 20 volt source of direct current with the positive side connected to one end electrode and the negative side to the other end electrode and to ground, with 18 amperes of current flowing and the liquid flowing through the cell at 3½ g.p.m. The effluent was changed to light straw color liquid and both liquid and solids were deodorized. Complete analysis of the treated effluent for bacterial count has not yet been obtained.

Vegetable waste slurry from a potato processing plant which was quite odoriferous and showed a standard plate count of 42,000,000 per 100 ml. was also treated in the same manner as the hog lagoon waste. This resulted in deodorizing and decoloring the effluent from the cell so that the liquid portion of the waste was considered to be reusable. Complete analysis of the treated effluent has not been received as yet.

In all of the foregoing test operations, the waste fluid entering the treatment had a pH of the order of 7 to 8 and after treatment the effluent liquid had a slightly lower pH of 6 to 7. The operations were carried out at the atmospheric temperature where the operations were performed, that is in the range of 60° F to 80° F.

I claim:

1. A method of treating sewage and recovering reusable water and solids substantially free of live bacteria which comprises:
   a. diluting the sewage with water to greater than 20 parts water to one part solids by weight;
   b. macerating the diluted material to reduce the solids therein to free any contained hard solids heavier than water and to break up the other solids to an extent that they are carried in suspension;
   c. passing the diluted macerated sewage upwardly through a screen thereby separating the non-suspended solids from the liquid that have not been reduced in size by maceration,
   d. adjusting the chloride salt content of the sewage to between a minimum of 0.05% and a maximum of 3.5% by weight;
   e. passing the screened sewage in a serpentine path progressively between a series of parallel electrodes that are not attacked by the sewage;
   f. applying an electrical voltage across end electrodes of the series of sufficient magnitude to create a varying voltage potential between adjacent intermediate electrodes so that each intermediate electrode serves as a cathode with respect to one adjacent electrode and as an anode with respect to the other adjacent electrode and so that the electrical current flow between adjacent electrodes through the sewage is between 0.25 and 1.0 amps per square inch of electrode surface;
   g. removing evolved gases as the sewage progressively passes between the electrodes; and
   h. separating the liquid and suspended solids after the sewage passes between the electrodes.

2. The method defined in claim 1 wherein the gases evolved from the liquid leaving the first pair of anode-cathode electrodes is reintroduced into the liquid and passed between the last anode-cathode pair of electrodes before final removal of the gases from the liquid.

3. The method defined in claim 1 wherein the anodes and cathodes are characterized by having a surface of the platinum group of metals.

4. The method defined in claim 1 wherein the anodes and cathodes comprise titanium plates coated with platinum.

5. The method defined in claim 1 wherein the liquid is introduced initially into a cell containing the anode-cathode pairs at ground potential and gradually raised in potential, then lowered gradually in potential while in the cell and discharged from the cell at about ground potential.

6. The method defined in claim 1 wherein the anode-cathode pairs of electrodes are concentric sleeves with each cathode surface being substantially larger in surface area than its anode.

* * * * *